(12) United States Patent
Wang et al.

(10) Patent No.: US 8,451,292 B2
(45) Date of Patent: May 28, 2013

(54) VIDEO SUMMARIZATION METHOD BASED ON MINING STORY STRUCTURE AND SEMANTIC RELATIONS AMONG CONCEPT ENTITIES THEREOF

(75) Inventors: Jhing-Fa Wang, Tainan (TW); Bo-Wei Chen, Tainan (TW); Jia-Ching Wang, Tainan (TW); Chia-Hung Chang, Taichung Hsien (TW)

(73) Assignee: National Cheng Kung University, Tainan (TW)

( * ) Notice: Subject to any disclaimer, the term of this patent is extended or adjusted under 35 U.S.C. 154(b) by 792 days.

(21) Appl. No.: 12/623,466

(22) Filed: Nov. 23, 2009

(65) Prior Publication Data

US 2011/0122137 A1    May 26, 2011

(51) Int. Cl.
*G09G 5/00*    (2006.01)
*G06T 11/20*    (2006.01)

(52) U.S. Cl.
USPC .......................................... 345/619; 345/440

(58) Field of Classification Search
USPC ........................................................ 345/440
See application file for complete search history.

(56) References Cited

PUBLICATIONS

Y. Rui, T.S. Huang, and S. Mehrota, "Exploring video structure beyond the shots," in Proc. 1998 IEEE Int. Conf. Multimedia Computing and Systems, Austin, TX, Jun. 28-Jul. 1, 1998, pp. 237-240.
B. T. Truong, C. Dorai, and S. Venkatesh, "New enhancements to cut, fade, and dissolve detection processes in video segmentation," in Proc. 8th ACM Int. Conf. Multimdia Marina del Rey, CA, Oct. 30-Nov. 3, 2000, pp. 219-227.
T.-H. Tsai and Y. C. Chen, "A robust shot change detection method for content-based retrieval," in Proc. 2005 IEEE Int. Symp. Circuits and Systems, Taoyuan, Taiwan, May 23-26, 2005, pp. 4590-4593.
Y. Rui, T.S. Huang, and S. Mehrotra, "Constructing table-of-content for videos," Multimedia Systems, vol. 7, No. 5, pp. 359-368, 1999.
A. Velivelli and T. S. Huang, "Automatic video annotation by mining speech transcripts," in Proc. 2006 IEEE Int. Cont. Computer Vision and pattern Recognition, New York, NY, Jun. 17-22, 2006, pp. 115-122.
D. Pelleg and A. Moore, "X-means: extending K-means with efficient estimation of the number of clusters," in Proc. 17th Int. Conf. Machine Learning, Standord, CA, Jun. 29-Jul. 12, 2000, pp. 727-734.
S. Patwardhan, S. Banerje, and T. Pedersen, "SenseRelate: TargetWord—a generalized frarmework for word sense disambiguation," in Proc. 43rd Annu. Meeting of the Association for Computational Linguistics, Michigan, MI, Jun. 25-30, 2005, pp. 73-76.

*Primary Examiner* — James A Thompson
*Assistant Examiner* — Wynton S Jones
(74) *Attorney, Agent, or Firm* — patenttm.us (57) ABSTRACT

A video summarized method based on mining the story structure and semantic relations among concept entities has steps of processing a video to generate multiple important shots that are annotated with respective keywords: Performing a concept expansion process by using the keywords to create expansion trees for the annotated shots; rearranging the keywords of the expansion trees and classifying to calculate relations thereof; applying a graph entropy algorithm to determine significant shots and edges interconnected with the shots. Based on the determined result of the graph entropy algorithm, a structured relational graph is built to display the significant shots and edges thereof. Consequently, users can more rapidly browse the content of a video and comprehend if different shots are related.

10 Claims, 9 Drawing Sheets

FIG.9
PRIOR ART ured video summarized information can be established based on the classification rule. Therefore, users can more rapidly browse the content of a video and comprehend if different shots are related. Such a method can be applied to fields, such as, image query, video system, news content summarization, video database (digital collection of documentary film or video content analysis) and video on demand.

VIDEO SUMMARIZATION METHOD BASED ON MINING STORY STRUCTURE AND SEMANTIC RELATIONS AMONG CONCEPT ENTITIES THEREOF

BACKGROUND OF THE INVENTION

1. Field of the Invention

The present invention is related to a video summarization method based on story structure thereof, and more particularly to a video summarization method that automatically establishes summarized frames with meaningful relationships for users to rapidly browse or search for required video information.

2. Description of the Related Art

Figure 9:
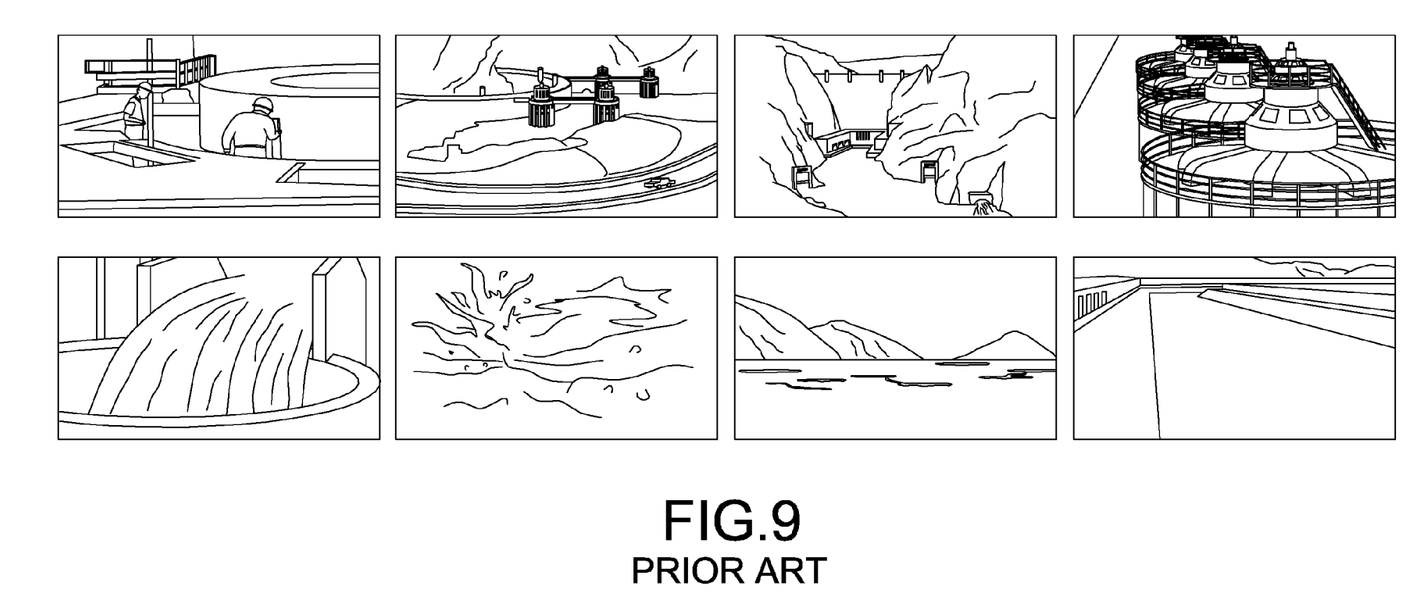
FIG. 9 shows a plurality of frames captured from a video by the traditional static storyboard method.

Current video summarization methods are generally categorized into two types, namely, static storyboard methods and dynamic skimming ones. With reference to FIG. 9, the static storyboard method captures a plurality of frames from a video and directly displays these frames to viewers. However, due to limited frames captured by the static storyboard method, the scenarios demonstrated by the frames are rather jumpy and hardly present the whole story of the video. Accordingly, viewers usually fail to fully comprehend the story conveyed by the original video.

On the other hand, the so-called dynamic skimming method is to demonstrate a short dynamically summarized video for people to view. The dynamically summarized video may be multiple video shots cut from the original video and recombined to form a single video file. In contrast to the static storyboard method, the dynamic skimming method introduces relatively continuous contents of a video.

Regardless, none of the above-mentioned methods can be qualified as a conceptually organized video summarizing technique.

SUMMARY OF THE INVENTION

An objective of the present invention is to provide a video summarized method based on mining the story structure and semantic relations among concept entities. The video summarized method automatically captures representative shots from a video file, creates annotation thereon based on a determined classification rules, such as the classification types represented by who, where, when and what, links related shots, and provides a browsing interface to display the shots and the linking relationships thereof.

To achieve the forgoing objective, the video summarized method has steps of:

reading a video file composed of a plurality of shots and having a caption file;

adding annotations to each shot;

using the annotations of each shot as roots to perform concept expansion so as to create a concept expanding tree structure for each shot;

calculating dependency degree between each child node and the parent node thereof in each concept expanding tree structure;

dividing the annotations in each shot into a plurality of classification types and providing a structured relational graph, wherein the plurality of shots are aligned in corresponding groups based on the pertaining classification types, and each shot serves as a vertex.

classifying all child nodes in the concept expanding tree based on the plurality of classification types;

rearranging the original concept expanding tree into a new bi-level tree using the original annotations as root nodes and the child nodes of each classification type as child nodes of the root nodes;

calculating relations of all bi-level trees; and calculating significance of all vertices in the relational graph and significance of edges connected with these vertices in accordance with a graph entropy algorithm, and eliminating less significant vertices and edges based on the calculation result.

Given the approach of the present invention, struct

DETAILED DESCRIPTION OF THE INVENTION

Figure 1:
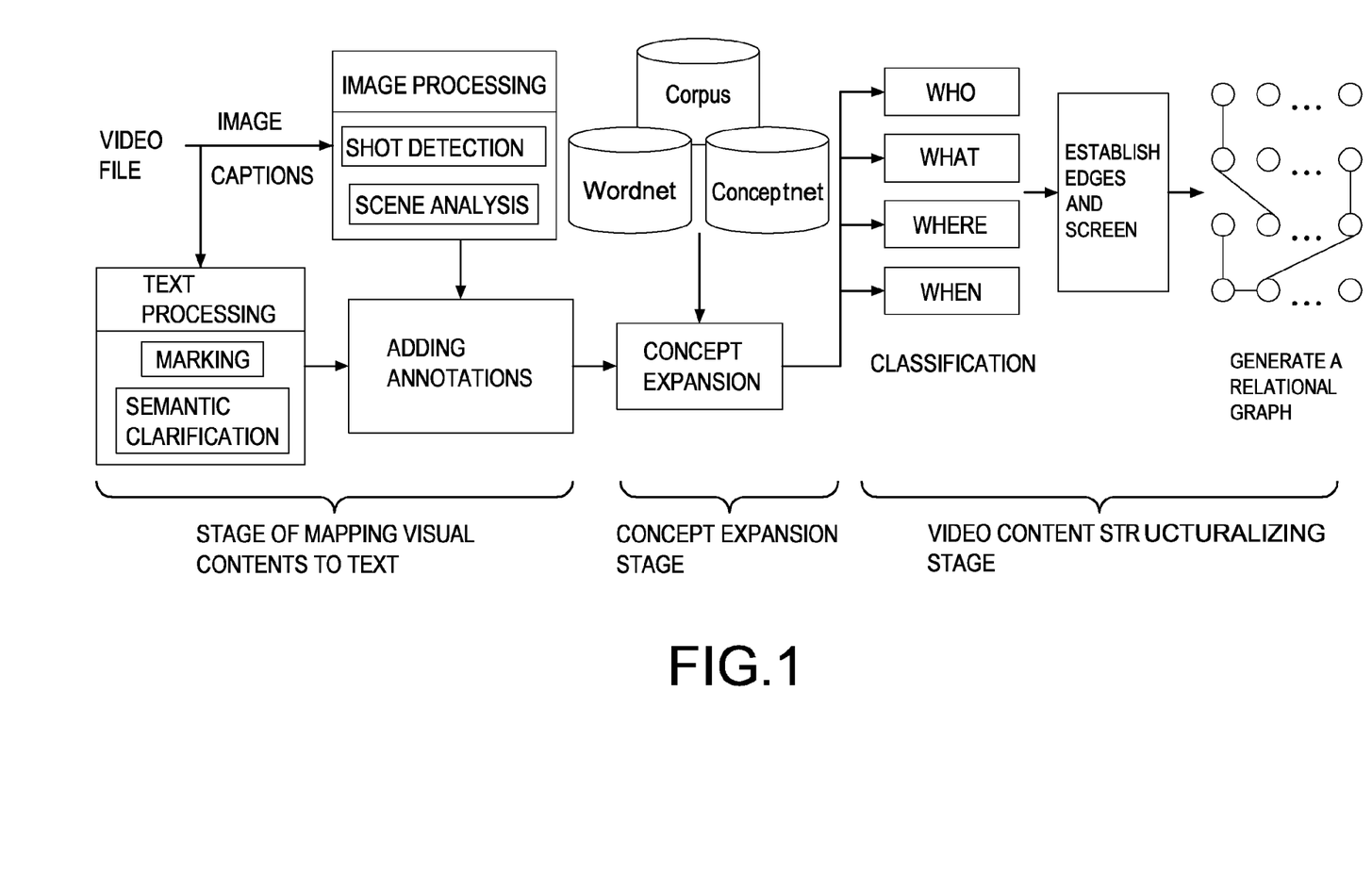
FIG. 1 is a schematic view of a video summarization system based on story structure of the present invention.

With reference to FIG. 1, a video summarized system based on story structure of the present invention receives an original video file having captions and outputs a relational graph capable of presenting summarized information of the video file. Given the captions in English as an example, the relational graph is composed of a plurality of screened video shots. Each of the video shots in the relational graph is considered as a vertex. If one vertex is associated with the content of another, they are connected with an edge. A relational graph building process is roughly classified into three stages, that is, a stage of mapping visual contents to text, a concept expansion stage and a final video content structuralizing stage, which are introduced as follows:

I. Stage of Mapping Visual Contents to Text

This stage mainly targets at annotating each video shot for building the semantic-related relational graph in later stages. In the embodiment, an image block-based technique is adopted as an example to annotate each video shot. Beyond that, any technique available to provide annotation can be also an option. For example, the simplest approach is to select at least one keyword from corresponding captions in a video and use the at least one keyword as the annotation of the video shot. Besides, to prevent the posterior tasks from being overly complicated, the embodiment only applies one annotation to each video shot. The tasks executed at this stage have a visual and text contents pre-analysis step and a maximum entropy criterion-based annotation step.

A. Visual and Text Contents Pre-Analysis Step

The technique automatically recognizing and capturing video shots from a video has been an existing technique. For example, boundaries of a video shot are detected according to the following reference information (Y. Ruim T. S. Huang, and S. Mehrota, "Exploring video structure beyond the shots," in *Proc.* 1998 *IEEE Int. Conf. Multimedia Computing and Systems*, Austin, Tex., 1998, Jun. 28-Jul. 1, pp 237-240; B. T. Truong, C. Dorai, and S. Venkatesh, "New enhancements to cut, fade, and dissolve detection processes in video segmentation," in *Proc. 8th ACM Int. Conf. Multimdia* Marina del Rey, C A, 2000, Oct. 30-Nov. 3, pp. 219-227; T. H. Tsai and Y. C. Chen, "A robust shot change detection method for content-based retrieval," in *Proc.* 2005 *IEEE Int. Symp. Circuits and Systems*, Taoyuan, Taiwan, 2005, May 23-26, PP. 4590-4593). Frames are analyzed or a middle frame of a video shot is captured to represent the video shot according to the following reference information (Y. Ruim T. S. Huang, and S. Mehrota, "Exploring video structure beyond the shots," in *Proc.* 1998 *IEEE Int. Conf. Multimedia Computing and Systems*, Austin, Tex., 1998, Jun. 28-Jul. 1, pp 237-240; Y. Rui, T. S. Huang, and S. Mehrotra, "Constructing table-of-content for videos,"*Multimedia Systems*, vol. 7, no. 5, pp. 359-368, 1999).

Group several similar video shots to form a video group, and further group several similar video groups to form a video scene. A scene construction algorithm is addressed as follows:

Scene Construction Algorithm
Initialization
designating the first shot as the initial group and scene;
for each shot s
begin
calculating the similarity between shot s and each group g by:

$$GrpSim_{s,g} = ShtSim_{s,g_{last}};$$

finding the maximal group-similarity by:

$$MaxGrpSim_s = \underset{g}{\mathrm{argmax}}\, GrpSim_{s,g};$$

determining which group to assign by:
if $MaxGrpSim_s > GrpThd$, merging s to $g_{max}$;
else s is a new group;
calculating the similarity between shot s and each scene SC by:

$$ScnSim_{s,SC} = \frac{1}{numGrp(SC)} \sum_{g}^{numGrp(SC)} GrpSim_{s,g};$$

finding the maximal scene-similarity by:

$$MaxScnSim_s = \underset{SC}{\mathrm{argmax}}\, ScnSim_{s,SC};$$

determining which scene to assign by:
if $MaxScnSim_x > ScnThd$, merging s to $SC_{max}$;
else s is a single group in a new scene;
end The scene construction algorithm is used to determine to which video scene a video shot pertains.

Subsequently, extract characteristics from the middle frame representing each video shot according to, for example, an approach mentioned in the following reference information (A. Velivelli and T. S. Huang, "Automatic video annotation by mining speech transcripts," in Proc. 2006 *IEEE Int. Conf. Computer Vision and pattern Recognition*, New York, N.Y., 2006, Jun. 17-22, pp. 115-122). Divide the middle frame of each video shot into a plurality of blocks, for example, 6×6 blocks. Calculate to obtain each block expressed by a 23-dimensional characteristic vector based on color, texture, location and motion vectors: In collaboration with a human visual characteristic (HVC) histogram, a mean and a variance thereof are taken as a 6-dimensional color characteristic vector; apply a 6-orientationed Gabor filter to a block to obtain a mean and a variance from all directions so as to acquire a 12-dimensional texture characteristic vector. Define a location characteristic vector by the (x,y) coordinates of the block in the middle frame. Lastly, estimate to obtain a motion vector using a 3-dimensional vector.

After extracting the characteristics, cluster all blocks in the middle frame by, for example, the X-means algorithm as mentioned in the following reference information (D. Pelleg and A. Moore, "X-means: extending K-means with efficient estimation of the number of clusters," in *Proc.* 17*th Int. Conf Machine Learning*, Standord, Calif., 2000, Jun. 29-Jul. 2, pp. 727-734). The clustered blocks are expressed by $V = \{v_1, \ldots, v_{|v|}\}$, where $v_i$ represents a single block, $i = 1 \ldots |V|$.

As for the text part of captions, collect multiple video files and the corresponding caption files beforehand as training data. Preliminarily mark keywords and identified word sense as mentioned in the following reference information (S. Patwardhan, S. Banerje, and T. Pedersen, "SenseRelate: Target-Word—a generalized framework for word sense disambiguation," in *Proc.* 43*rd Annu. Meeting of the Association for Computational Linguistics*, Michigan, Mich., 2005, Jun. 25-30, pp. 73-76) and screen out non-noun words. The resulting keyword data set is expressed by $W = \{w_1, \ldots, w_{|W|}\}$, where $j = 1, \ldots, |W|$.

Furthermore, use currently collected literary works to test the relation among different annotations. Such collected literary works can be accessible by downloading various articles from the Wikipedia. To acquire articles associated with the video to be summarized, first sort the keywords in the keyword data set based on the frequency of occurrence thereof. In the embodiment, keep the 25%-35% keywords with higher frequency of occurrence. Compare each retained keyword with each article of the collected literary works one by one, and retain the articles pertinent to the caption files according to the compared result. These articles serve as a knowledge base B.

B. Maximum Entropy Criterion-Based Annotation Step

The maximum entropy method serves to estimate co-occurrences between video data and text data, indicating that each frame of image data x has a corresponding annotation y generated therefor. The co-occurrence relation between video and text can be estimated based on two training data sets V and W. Assume that the training data sets V and W are already available, let k represent an index of a training pair data (v,w) where $(v,w) \in \{V \times W\}$, and v represent a block in V and w represent a keyword in W. Hence, the total number of the permutation and combination of $\{V \times W\}$ is $|V| \times |W|$.

The training data stem from the collected and paired video data and annotation (x,y). The dependence degree between video data and annotation is expressed by the following function.

$$f_k(x, y) = \delta_{yw} \times \#(v, x), \quad (1)$$

$$\delta_{yw} = \begin{cases} 1, & \text{if } y = w \\ 0, & \text{otherwise} \end{cases}$$

where k=1, ..., |V|×|W|, δ is a Kronecker delta function, x represents image data, y represents one word from captions, and # (v,x) represents the number of matching blocks in x. To focus on the word to be determined, the above function can define the dependency degree therefor. Next keep scanning the training data to estimate the dependency degree with respect to each paired data.

After finishing the estimation, use the following function to express the correlation of images and annotations.

$$P(y | x) = \frac{1}{Z(x)} \exp\left(\sum_{k=1}^{|V|\times|W|} \lambda_k f_k(x, y)\right) \quad (2)$$

where $$Z(x) = \sum_y \exp\left(\sum_{k=1}^{|V|\times|W|} \lambda_k f_k(x, y)\right), \lambda_k$$

is a parameter used in $f_k(x,y)$. When obtaining the $f_k(x,y)$ according to sampled data, use a generalized iterative scaling (GIS) algorithm to estimate $\lambda_k$. Let D represent a keyword set of the captions of the original video file to be summarized. After finishing the training process, each frame of annotation is expressed by $$y^* = \underset{y \in D}{\operatorname{argmax}} P(y | x).$$

This function is applied to test an unannotated image with keywords in the keyword set. The keyword with the highest score is the annotation of the image. As the present invention employs the middle frame of each video shot to represent the video shot, each video shot can be assigned an appropriate keyword.

II. Concept Expansion Stage

When creating a relational graph, determine to connect different video shots according to relations among them. Hence, the present invention is indeed the one employing concept expansion method to determine relations among annotations. The objective of concept expansion is to expand the meanings of each video shot and annotation, if appropriate. The embodiment adopts two dictionaries, that is, WordNet and ConceptNet. The detailed implementation is as follows:

A. Constructing Trees

Figure 2:
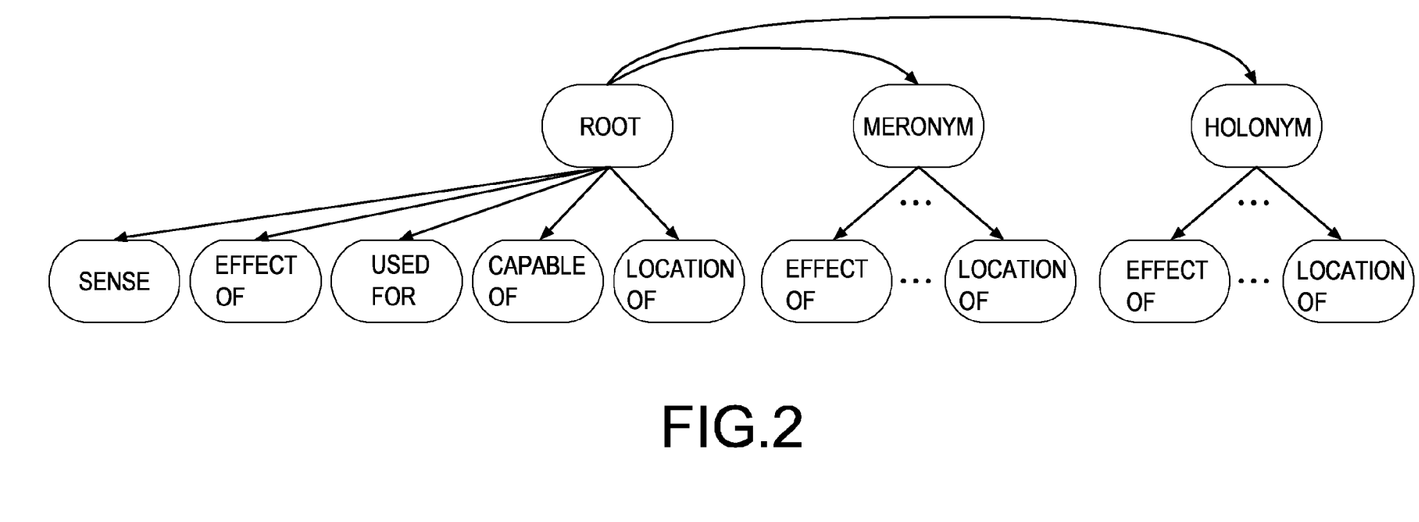
FIG. 2 is a structure diagram of a concept expansion tree of the present invention.

With reference to FIG. 2, the present invention employs a tree structure to represent mutual dependency among expanded vocabularies. Take an annotation of a video shot as a root r. The root is defined as a first level. Derive several levels of child nodes from the root r, and each of the child nodes directly or indirectly represents the expanded meanings of the root.

When constructing the tree structure, refer to WordNet to query the sense, meronym (parts-of) and holonym (is-a-part-of). Besides, also refer to ConceptNet to query if the root r has the meanings in association with the phrases, including "capable of", "used for", "effect of" and "location of" and serving as expanded words. The expanded words selected by the present invention are either noun or verbal noun. The oval node displayed on FIG. 2 represents the literal meanings expanded from the root.

B. Dependency Degree Function

The dependency degree considered at this stage functions to filter inappropriately expanded child nodes, thereby eliminating inadequate dependency. When calculating the dependency degree between a parent node and a child node thereof, use two-layered moving windows to scan the tree structure. The moving windows cover parent nodes and child nodes thereunder. Such coverage can be treated as a tree structure.

Figure 3:
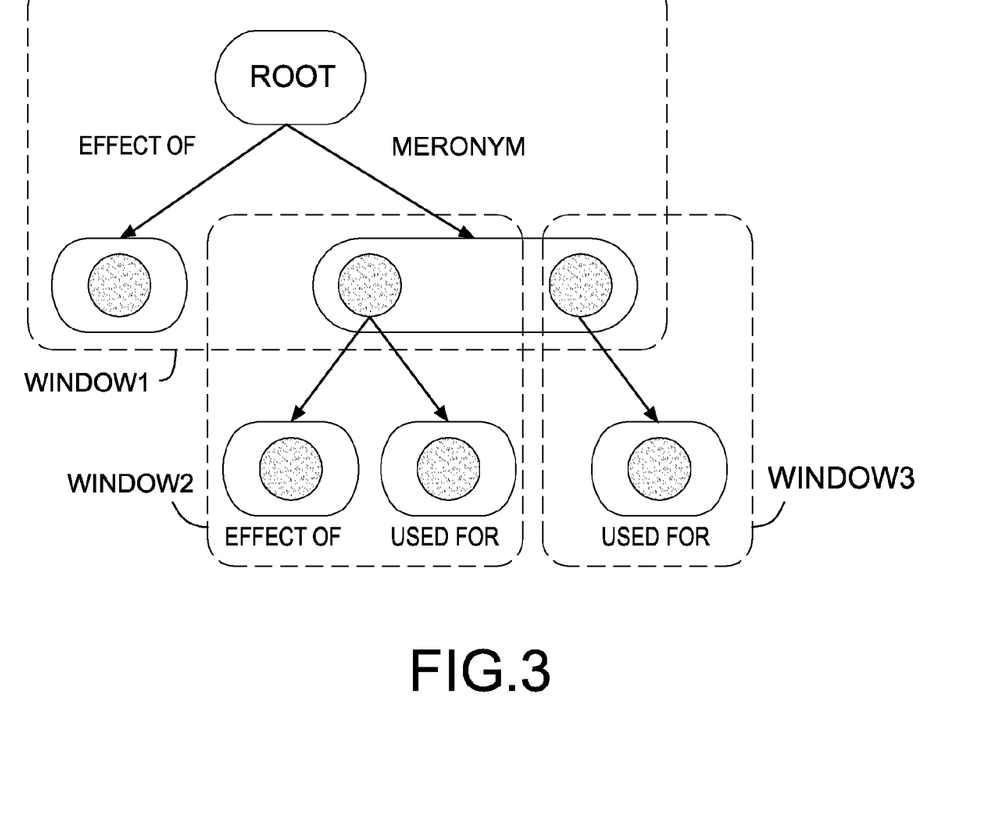
FIG. 3 is a partial structure diagram of a concept expansion tree of the present invention.

Given a subtree derived from the root nodes located at the first level, any child node c of the subtree depends on its parent node ρ, name of video shot T, and caption keyword set D, and the conditional probability of the child node can be expressed by the following function:

$$P(c | \rho, T, D) = \frac{P(T | c, \rho) P(D | c, \rho) P(c | \rho) P(\rho)}{\sum_{c_l \in C} P(T | c_l, \rho) P(D | c_l, \rho) P(c_l | \rho) P(\rho)} \quad (3)$$

where C represents a set of all child nodes at a same level and is obtained from querying the child nodes having identical concept as the child node c, $c_l$ is one node in C. P(ρ) is obtained by referring to the frequency of occurrence of words in existing articles, for example, the articles in Wikipedia. The value of P(c|ρ, T, D) is obtained based on caption keywords in the keyword set. In the embodiment, select five keywords having highest frequency of occurrence, and compare each keyword with the knowledge base B. P(D,c,γ) is obtained by simultaneously comparing c and γ. P(T|c,ρ) can be obtained in a similar way. With reference to FIG. 3, after multiplying two intersected moving windows, obtain the dependencies between parent nodes and child nodes. The oval nodes in FIG. 3 represent concept relations obtained after consulting dictionaries. Round nodes inside the oval nodes represent expanded words under a same concept relation.

III. Video Content Structuralizing Stage

To demonstrate a video shot finished with annotation processing by using a relational graph having structured relations, the present invention executes steps of classifying video shots according to the annotations thereof, constructing vertices in the relational graph and expanding with concept expanding trees thereof, and linking related vertices with the concept expanding trees.

A. Annotation Classification

The concept of hypernym can be used to express the hierarchical relation between two words. Given the example of the word "teacher", this word belongs to a subset of the word "person" while "person" is defined in a concept classification of WordNet. In other words, "person" is a hypernym of "teacher".

The present invention employs four classification types represented by "who", "where", "when" and "what", to classify.

a. Regarding the aspect of "who", names and characters of persons are contained in a subset thereof. For example, "teacher", "worker" and "musician" in dictionaries belong to the subset of "who" and are classified under this classification type.

b. Regarding the aspect of "where", "social group", "building", "location" and the like belong to this classification type.

c. Regarding the aspect of "when", time and relevant words all belong to this classification type.

d. Regarding the aspect of "what", any words not classified in the above three aspects belong to this classification type.

B. Constructing Vertices in the Relational Graph

To facilitate description, use s to stand for a shot, a for annotation thereof, o for a concept expanding tree on the basis of a as a root node. The three elements are expressed as a tuple (s, a, o).

First of all, classify all tuples based on the annotations thereof into four types, that is, "who", "where", "when" and "what". Further build a table having four columns, and each of the columns represents one of the four types. When assigning each tuple to one of the four types (columns), construct a vertex representing the tuple in this type.

Figure 4:
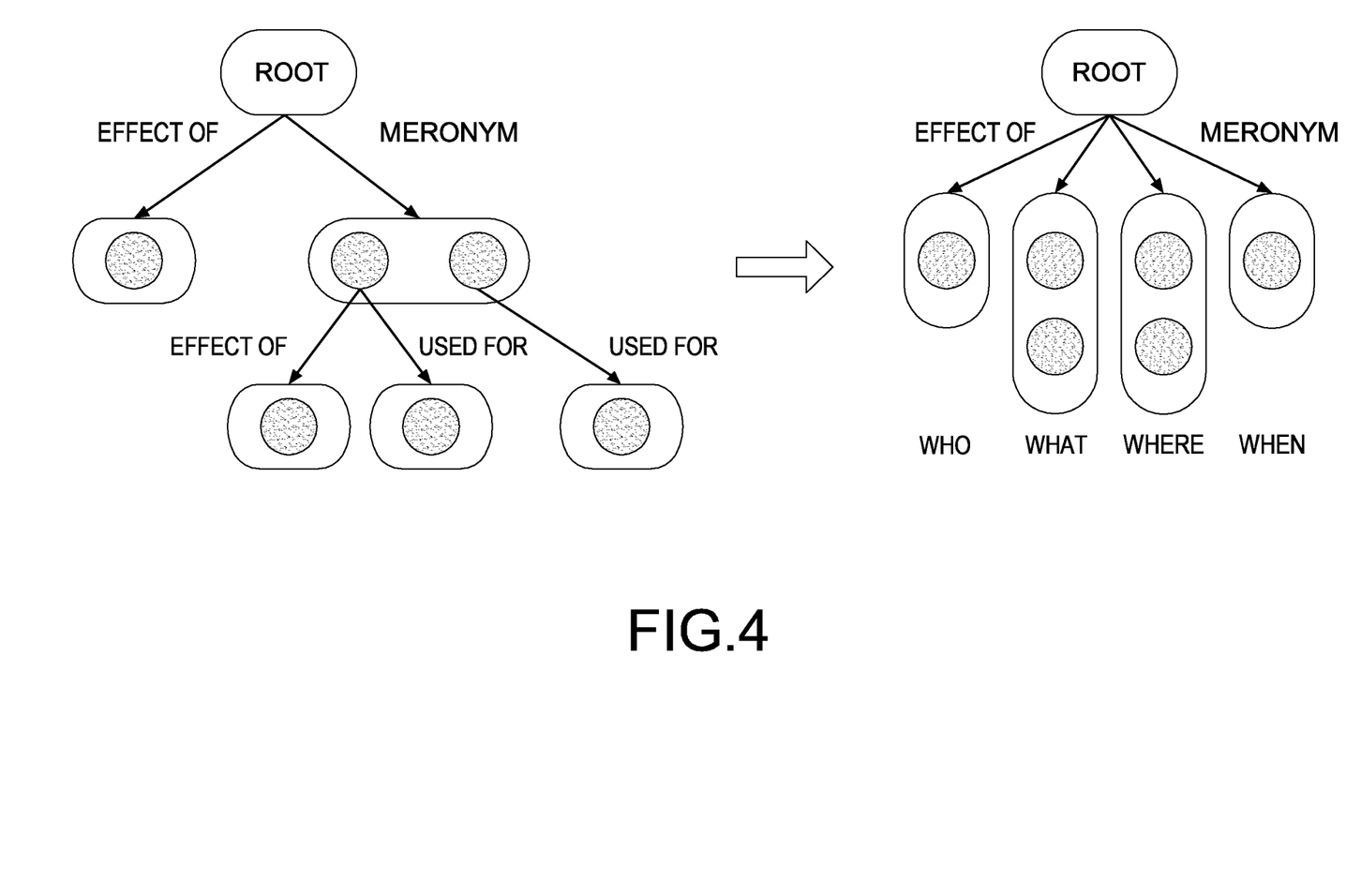
FIG. 4 is a schematic diagram of a rearranged concept expansion tree of the present invention.

With reference to FIG. 4, rearrange the original concept expanding tree to form another new tree structure. For the concept expanding tree of each tuple, except the root node a, adequately classify other child nodes into the aforementioned four types so as to form a two-level tree structure. Each child node in the new tree structure may cover multiple keywords.

C. Building Up Relations of Tuples in the Relational Graph

Figure 5:
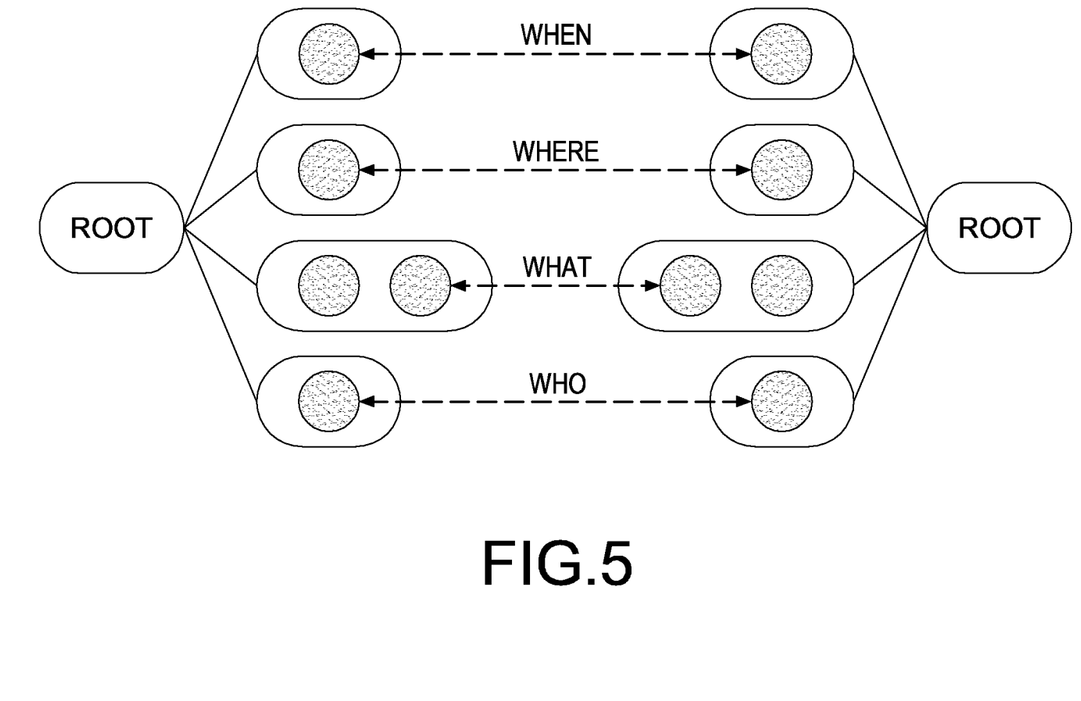
FIG. 5 is a schematic view of estimating relationships between two concept expansion trees of the present invention.

To ascertain the relation between two tuples (s, a, o), use the concept expanding tree o as a judgement criterion. In other words, compare the corresponding root node and child nodes in the concept expanding tree. With reference to FIG. 5, the present invention employs the rearranged concept expanding tree to compare. The dashed lines in FIG. 5 represent the relation between nodes or node sets. The relation between two concept expanding trees can be expressed by the following function:

$$\Gamma(\alpha,\beta) = \text{Relation}_{root}(\alpha,\beta) \times \text{Relation}_{child}(\alpha,\beta) \quad (4)$$

where $\alpha$ and $\beta$ represent two tuples, $\text{Relation}_{root}(\alpha,\beta)$ represents the relation between two root nodes, $\text{Relation}_{child}(\alpha,\beta)$ represents the relation between two sets of child nodes. Calculation of $\text{Relation}_{root}(\alpha,\beta)$ and $\text{Relation}_{child}(\alpha,\beta)$ is described in details as follows:

1. Calculate Relation of Root Nodes

As the annotation of the root node is obtained from the caption, its relation is preferably estimated based on content of captions so that a more direct and referential result can be obtained. The calculation is expressed by the following function:

$$\text{Relation}(\alpha, \beta) = \frac{sent_{\alpha,\beta}}{\text{the number of sentences}} \quad (5)$$

where $sent_{\alpha,\beta}$ represents the number of sentences of the annotations in the captions having two root nodes, and the denominator is the total number of sentences of the caption file.

2. Calculate Relations of Sets of Child Nodes

There are four types of child nodes in each tree structure. To simplify sophistication of comparison, the present invention is restricted to compare only when the types of nodes are the same. When assigning two child nodes, determine their relation based on if they contain identical keyword therein. If they do, build up relation in the two tree structures. The calculation is expressed by the following function:

$$\text{Relation}_{type}(I, J) = \sum_{I,J} \frac{ident_{I,J}}{\text{the number of pairs}} \quad (6)$$

where I and J represent the child nodes of the same classification type in the two tree structures, $ident_{I,J}$ represents the number of I and J child nodes having the same keywords, and 'type' represents "who", "where", "when" and "what" of child nodes. For example, there are two keywords, that is, "student" and "pupil" in a tree structure, there is one keyword "student" in another tree structure, and all keywords are classified under the type "who". As the testing data pairs involved are two and there is one common keyword, the relation of the type "who" is ½.

The relations of child nodes of four types shall be separately calculated. If given two sets of tuples $\alpha$ and $\beta$, I represents a child node in the tuple $\alpha$, and J represents a child node in the tuple $\beta$, Equation (6) can be rewritten as:

$$\text{Relation}_{child}(\alpha, \beta) = \sum_{type} \left( \sum_{I,J} \frac{ident_{I,J}}{\text{the number of pairs}} \right)_{type} \quad (7)$$

Therefore, the above equation is available to estimate the relations of all child nodes.

D. Selecting Significant Vertices and Edges Thereof

In the embodiment, a graph entropy algorithm is used to determine which vertex substantially affects the relational graph after being deleted, and simultaneously analyze paths with different lengths. Assume that G=<U, E> represents a relational graph. U(G) represents all the vertices in the relational graph, and E(G) represents all the edges in the relational graph. A regular graph entropy function H(G) is expressed by:

$$H(G) = \sum_{s=1}^{|U|} P(u_s) \log(1/P(u_s)) \quad (8)$$

where $u_s$ represents a vertex (i.e. a shot), $s=1, \ldots, |U|$, $|U|$ represents the total number of all vertices in G, and $P(u_s)$ is a probability function of $u_s$.

When calculating the significance of each vertex, take both of the visual attention thereof and annotation to viewers into account. As the contents of frames in each vertex (i.e. shot) and annotation contents play significant roles in the video summarization process. Therefore, providing two contents at the same time facilitates viewers in comprehending the content of a video. Given a shot having annotations, its influence can be expressed by:

$$A(u_s) = \text{coef} \times \text{Visual Attention}(u_s) \times \text{Annotation Weight}(u_s) \quad (9)$$

where Visual Attention($u_s$) is the visual attention of $u_s$, Annotation Weight($u_s$) is the weight of the annotation of a shot, and coef is a weight given by users.

The visual attention Visual Attention($u_s$) can be expressed by:

$$VisualAttention(u_s) = \frac{mean_{u_s} \times dur_{u_s}}{mean_{SC_{u_s}} \times dur_{SC_{u_s}}} \quad (10)$$

where $mean_{u_s}$ represents attention to a shot s, $dur_{u_s}$ represents a playing time duration of s, $SC_{u_s}$ represents a scene of $u_s$, $mean_{SC\ u_s}$ represents attention to $SC_{u_s}$, and $dur_{SC\ u_s}$ represents a time duration of $SC_{u_s}$.

The weight of annotation of the shot s, Annotation Weight ($u_s$), is measured by rarity (the more rare, the more significant), and can be calculated by a Term Frequency-Inverse Document Frequency (TFIDF) function:

$$\text{Annotation Weight}(u_s) = TF(u_s, SC_{u_s}) \times IDF(u_s) \quad (11)$$

where $TF(u_s, SC_{u_s})$ represents the frequency of occurrence of $SC_{u_s}$ in a scene $u_s$, and $IDF(u_s)$ represents an inverse document frequency. When an annotation occurs more frequently, the inverse document frequency thereof is relatively lower. The inverse document frequency can be defined as:

$$IDF(u_s) = \log\frac{M}{DF(u_s)}$$

where M represents the total number of scene in a video file, $DF(u_s)$ represents a document frequency, that is, the total number of scene associated with the annotations of the shot $u_s$.

To estimate significance of an edge, the relational graph is decomposed into a plurality of paths with identical length. A path $\overline{u_m u_n}$ has two different vertices "$u_m$ and $u_n$" and one edge connected with the two vertices. Besides, the total number of paths is identical to the total number of edge |E|. The graph entropy functions of these paths can be rewritten as the following equation:

$$H(G) = \sum_{m,n=1}^{|U|} P(\overline{u_m u_n}) \log(1/P(\overline{u_m u_n})), \; m \neq n \quad (12)$$

where $P(\overline{u_m u_n})$ can be rewritten as the following equation by combining the aforementioned equations (4) and (9):

$$P(\overline{u_m u_n}) = A(u_m)\Gamma(u_m, u_n)A(u_n)$$

The algorithms for choosing significant vertices and edges are presented as follows:

Edge-Mining Algorithm
Decomposing G into length-one paths;
for each path
begin
calculating graph entropy $H_{edge}(G)$ according to equation (12);
obtaining G' by removing the edge of the current path from G;
calculating graph entropy $H_{edge}(G')$;
calculating the cross entropy $H_{edge}(G')/\log(H_{edge}(G'))/H_{edge}(G))$;
end
sorting each path's cross entropy.
Vertex-Mining Algorithm
for each vertex $u_s$, s=1, ..., |U|;
begin
calculating graph entropy $H_{vertex}(G)$ according to equation (8);
obtaining
G" by removing $u_s$;
calculating graph entropy $H_{vertex}(G")$;
calculating the cross entropy $H_{vertex}(G")/\log(H_{vertex}(G))$;
end
sorting each vertex's cross entropy.

Figure 7:
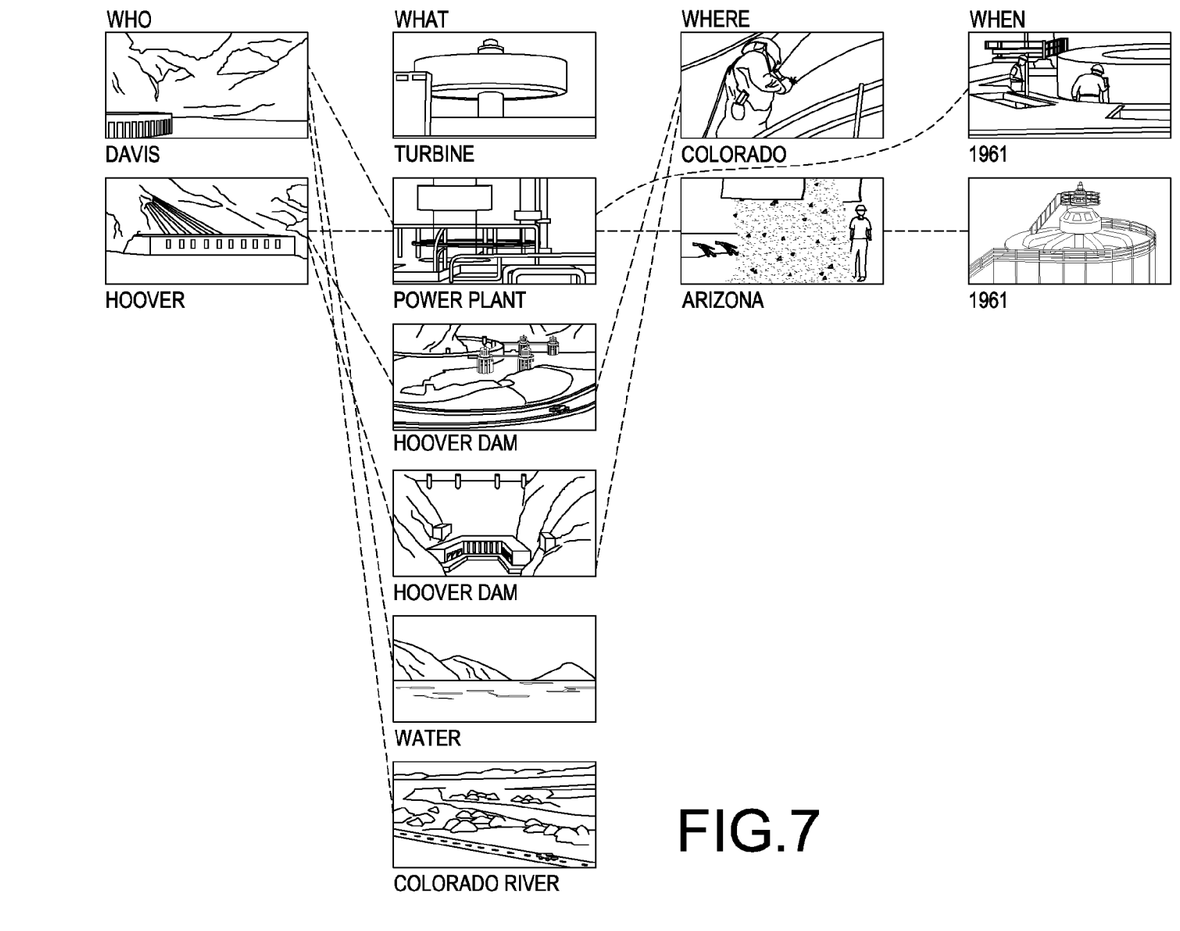
FIG. 7 is a relational graph having vertices and edges of the present invention.
Figure 8:
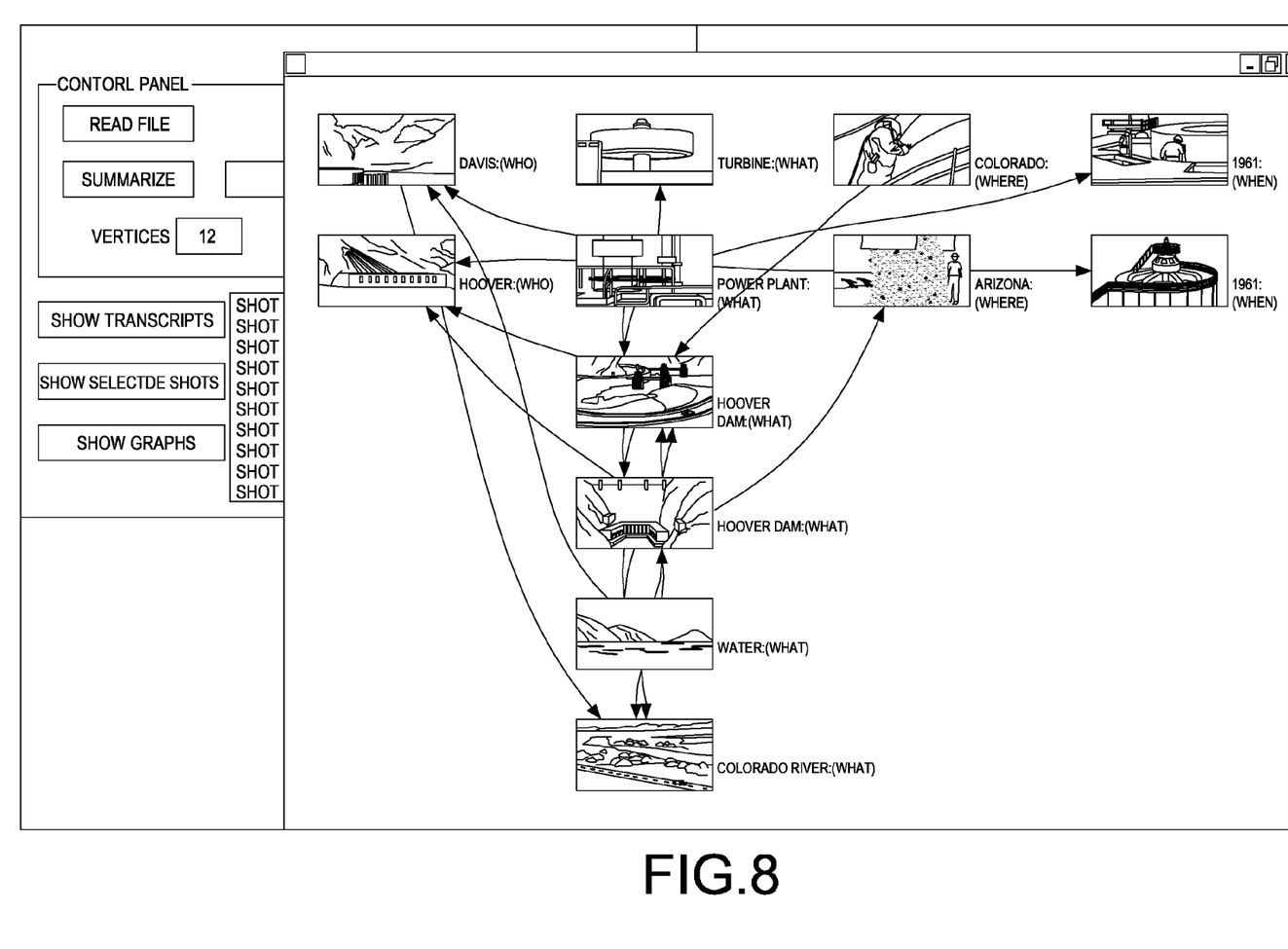
FIG. 8 is a relational graph displayed on a browsing interface of a computer in accordance with the present invention.

With reference to FIG. 7, eliminate those less significant shots and edges therewith based on the calculation result of equation (12), and retain those more significant shots. With reference to FIG. 8, the relational graph of the present invention is further displayed on a browsing interface of a computer to present shots and edges among them.

Figure 6:
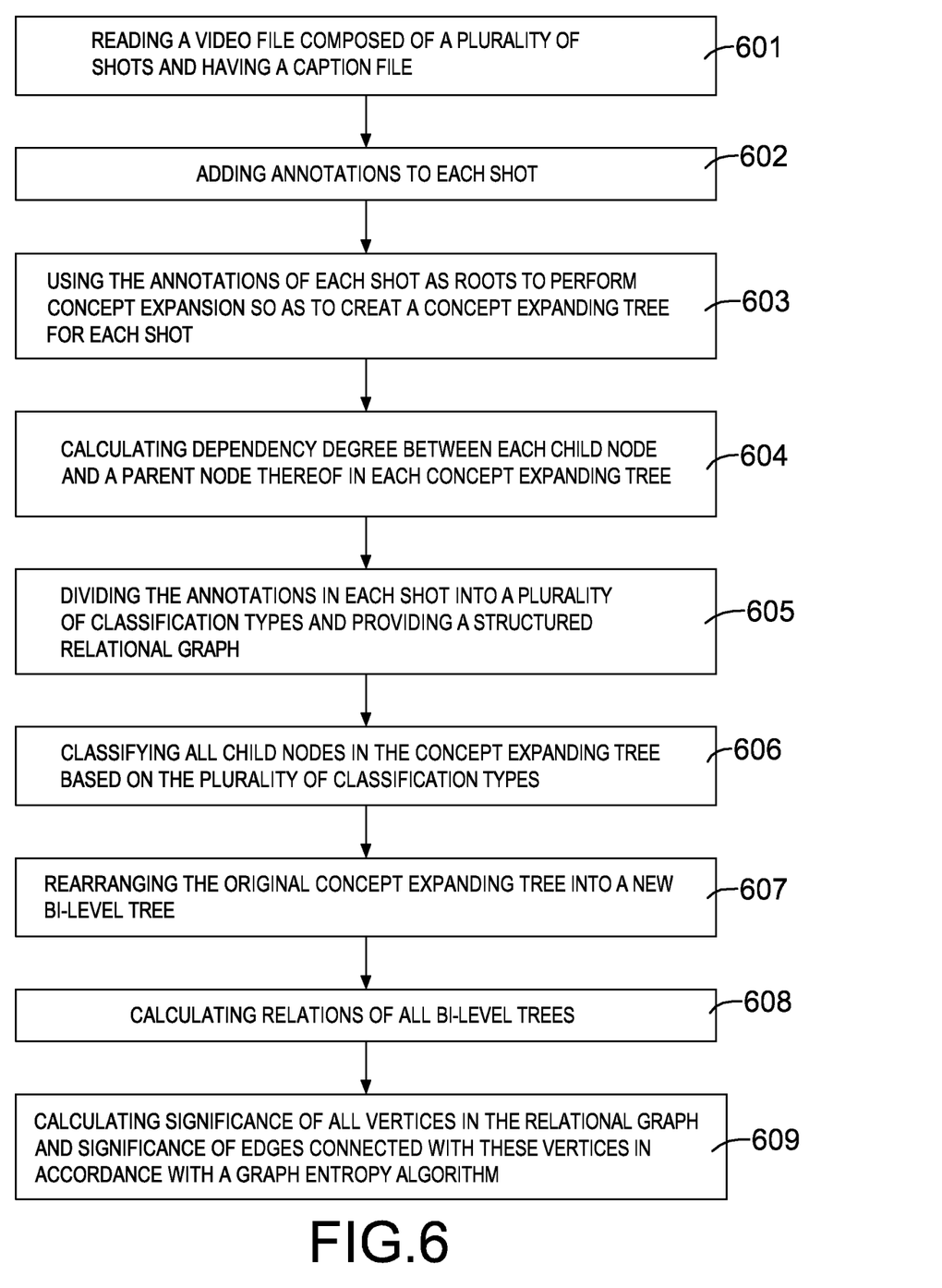
FIG. 6 is a flow diagram of a video summarized method based on story structure of the present invention.

With reference FIG. 6, the processes of a method in accordance with the present invention can be summarized as the following steps:

reading a video file composed of a plurality of shots and having a caption file (601);

adding annotations to each shot (602);

using the annotations of each shot as roots to perform concept expansion so as to create a concept expanding tree for each shot (603);

calculating dependency degree between each child node and the parent node thereof in each concept expanding tree (604);

dividing the annotations in each shot into a plurality of classification types and providing a structured relational graph (605), in which the plurality of shots are aligned in corresponding groups in the relational graph based on the pertaining classification types, and each shot in the relational graph serves as a vertex;

classifying all child nodes in the concept expanding tree based on the plurality of classification types (606);

rearranging the original concept expanding tree into a new bi-level tree (607) using the original annotations as root nodes and the child nodes of each classification type as child nodes of the root nodes;

calculating relations of all bi-level tree structures (608); and calculating significance of all vertices and edges in the relational graph (609) in accordance with a graph entropy algorithm, and eliminating less significant vertices and edges based on the calculation result.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A video summarization method based on mining story structure and semantic relations thereof, comprising:

reading a video file composed of a plurality of shots and having a caption file;

adding annotations to each shot;

using the annotations of each shot as roots to perform concept expansion so as to create a concept expanding tree for each shot;

calculating dependency degree between each child node and a parent node thereof in each concept expanding tree;

dividing the annotations in each shot into a plurality of classification types and providing a structured relational graph displayed on a browsing interface provided by a computer, the plurality of shots aligned in corresponding groups in the relational graph based on the pertaining classification types, and each shot in the relational graph serving as a vertex;

classifying all child nodes in the concept expanding tree based on the plurality of classification types;

rearranging the original concept expanding tree into a new bi-level tree using the original annotations as root nodes and the child nodes of each classification type as child nodes of the root nodes;

calculating relations of all bi-level trees; and calculating significance of all vertices and edges connected with the vertices in the relational graph in accordance with a graph entropy algorithm, and eliminating less significant vertices and edges based on the calculation result.

2. The video summarization method as claimed in claim 1, wherein the annotations of each shot are classified into four types represented by who, where, when and what.

3. The video summarization method as claimed in claim 2, wherein when performing concept expansion of the roots taken from the annotations of each shot, identify related words of the annotations through an automatic dictionary inquiring step to build up the concept expanding tree for each shot.

4. The video summarization method as claimed in claim 3, wherein the annotations and related words thereof in each shot are nouns or verbal nouns.

5. The video summarization method as claimed in claim 3, wherein when performing the automatic dictionary inquiring step, search senses, meronyms and holonyms of the roots to determine the related words of the roots.

6. The video summarization method as claimed in claim 3, wherein calculating dependency degree between each child node and a parent node thereof in each concept expanding tree is based on the following function:

$$P(c \mid \rho, T, D) = \frac{P(T \mid c, \rho)P(D \mid c, \rho)P(c \mid \rho)P(\rho)}{\sum_{c_l \in C} P(T \mid c_l, \rho)P(D \mid c_l, \rho)P(c_l \mid \rho)P(\rho)}$$

where C represents a set of all child nodes at a same level, $\rho$ represents a parent node, T represents a name of video shot, D represents a caption keyword set, $c_l$ represents one child node in C, and $P(\rho)$ is a known parameter.

7. The video summarization method as claimed in claim 3, wherein calculating relations of all the bi-level trees is based on the following function:

$$\Gamma(\alpha,\beta) = \text{Relation}_{root}(\alpha,\beta) \times \text{Relation}_{child}(\alpha,\beta)$$

where $\alpha$ and $\beta$ represent two tuples, $\text{Relation}_{root}(\alpha,\beta)$ represents the relation between two root nodes, $\text{Relation}_{child}(\alpha,\beta)$ represents the relation between two sets of child nodes.

8. The video summarization method as claimed in claim 7, wherein the $\text{Relation}_{root}(\alpha,\beta)$ between two root nodes is calculated by the following function:

$$\text{Relation}(\alpha, \beta) = \frac{\text{sent}_{\alpha,\beta}}{\text{the number of sentences}}$$

where $\text{sent}_{\alpha,\beta}$ represents a number of sentences of the annotations in the captions having two root nodes, and the denominator is a total number of sentence of the caption file.

9. The video summarization method as claimed in claim 7, wherein the relation between two root nodes, $\text{Relation}_{child}(\alpha, \beta)$ is calculated by the following function:

$$\text{Relation}_{type}(I, J) = \sum_{I,J} \frac{ident_{I,J}}{\text{the number of pairs}}$$

where I and J represent the child nodes having the same classification type in the two concept expanding trees, $ident_{I,J}$ represents the number of the I and J child nodes having identical keywords, and the type is the classification type represented by who, where, when and what associated with child nodes.

10. The video summarization method as claimed in claim 1, wherein calculating significance of all vertices in the relational graph and significance of edges connected with these vertices in accordance with a graph entropy algorithm is calculated by the following function:

$$H(G) = \sum_{m,n=1}^{|U|} P(\overline{u_m u_n}) \log(1 / P(\overline{u_m u_n})), m \neq n$$

where $u_m$ and $u_n$ represent two different vertices, $|U|$ represents a total number of all vertices, and $P(\overline{u_m u_n}) = A(u_m)\Gamma(u_m, u_n)A(u_n)$.

* * * * *